Figure 1:
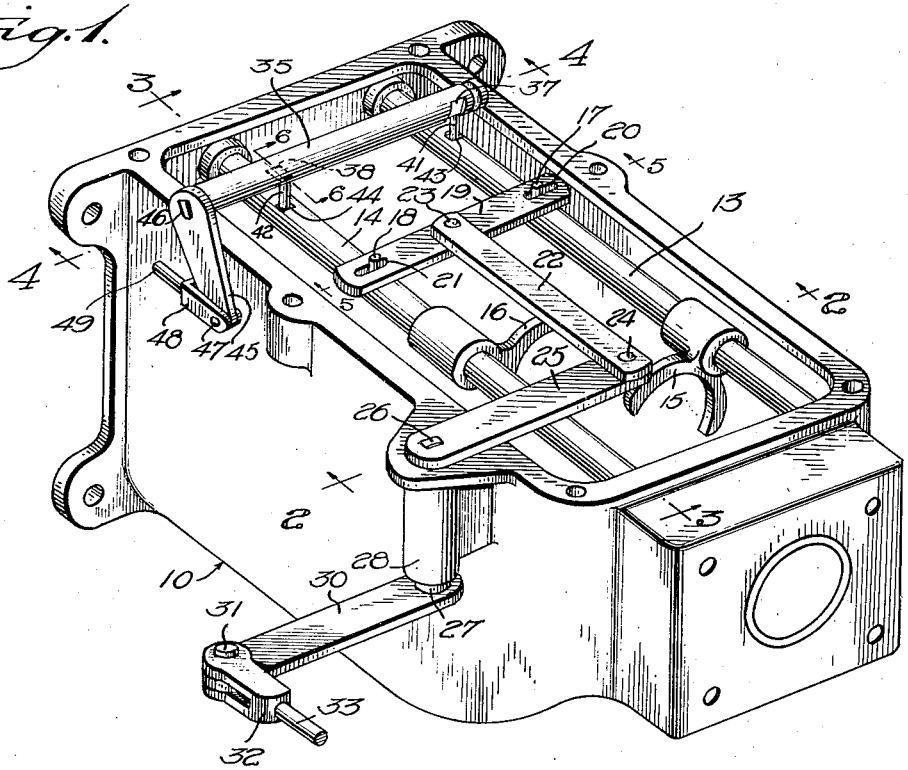

Dec. 9, 1941.   J. A. LAWLER   2,265,378
TRANSMISSION SHIFTING MECHANISM
Filed Aug. 27, 1937   2 Sheets-Sheet 1

Inventor
J. A. LAWLER

Dec. 9, 1941. J. A. LAWLER 2,265,378
TRANSMISSION SHIFTING MECHANISM
Filed Aug. 27, 1937 2 Sheets-Sheet 2

Inventor
J. A. LAWLER

Patented Dec. 9, 1941

2,265,378

UNITED STATES PATENT OFFICE 2,265,378

TRANSMISSION SHIFTING MECHANISM

John A. Lawler, Franklin, Mich., assignor to Automatic Shifters, Inc., Richmond, Va., a corporation of Virginia Application August 27, 1937, Serial No. 161,318

22 Claims. (Cl. 74—477)

This invention relates to transmission shifting mechanisms and more particularly to a mechanism especially adapted for use in connection with power operated mechanisms for shifting motor vehicle transmissions.

As is well known, it has been the common practice for many years to provide motor vehicle transmissions with two longitudinally slidable shift rails for effecting changes in the direction of movement of the vehicle and in the transmission ratios. Each of these shift rails is slidable in opposite directions from a neutral position to provide two different transmission ratios, and the shift rail which is not so moved is maintained in its neutral position in most constructions by means of spring pressed detents. The selection of the shift rails and the actuation thereof is controlled in conventional shifting mechanisms by a manually operable handle which is movable transversely to select a shift rail for operation and longitudinally for moving the selected shift rail.

Recently developed power operated mechanisms for motor vehicle transmissions have been adapted to conventional transmissions involving the shift rails referred to. Accordingly such power operated mechanisms have involved means having some element movable laterally with respect to the transmission to select either of the shift rails for actuation together with means for actuating the selected shift rail. The selecting means have been of various types and all in practical use have involved the transverse movement of some element into selective engagement with the shift rails. Such means have been operable against substantial friction and accordingly it has been the common practice to provide a motor of some type for effecting the crossover operation for selecting the shift rails for operation. The motors employed ordinarily are of the fluid pressure type, and accordingly it has been necessary to use a control valve mechanism for the crossover motor.

In the interests of simplicity, economy of manufacture and practicability, it is desirable to provide some means by which the selection of the shift rails may be effected manually while employing power means solely for the purpose of moving the selected shift rail. With prior constructions, the element of friction involved in the shift rail selecting means has rendered the manual operation of such means relatively difficult.

An important object of the present invention is to provide a shifting mechanism for use particularly with motor vehicle transmissions wherein the element of friction resisting the operation of selecting the shift rails for operation has been reduced to such a minimum as to render wholly practicable the manual selecting of the shift rails, thus permitting the elimination of crossover or selecting motors in power operated transmissions.

A further object is to provide an apparatus of this character wherein the results are accomplished by an extremely simple mechanism, thus materially reducing the cost of manufacture of the shifting apparatus as a whole.

A further object is to provide means for selecting the shift rails of a transmission for actuation without the necessity of providing slidable or other means movable transversely of the transmission.

A further object is to provide novel means for selecting the shift rails of a transmission for actuation by merely rocking a simple shaft on its axis without the necessity for sliding the shaft and thus introducing a substantial degree of friction.

A further object is to provide means for longitudinally moving the shift rails wherein force is applied to a plurality of rails, in combination with an extremely simple mechanism which operates to release only one of the shift rails for longitudinal movement.

A further object is to provide an apparatus of the character referred to wherein locking means are provided for the shift rails, said locking means functioning to release only one shift rail for movement and being operable without the use of cams, springs or any other devices or mechanisms which would require a substantial amount of force for their operation.

A further object is to provide a shift rail locking mechanism of the character referred to wherein the locking action is provided by the unresisted rocking of a shaft, the movement of the locking means out of engagement with the shift rail which is released for actuation being accomplished by movement of the shift rail itself upon the transmission of longitudinal shifting movement thereto.

Other objects and advantages of the invention will become apparent during the course of the following description.

In the drawings I have shown one embodiment of the invention. In this showing—

Figure 2:
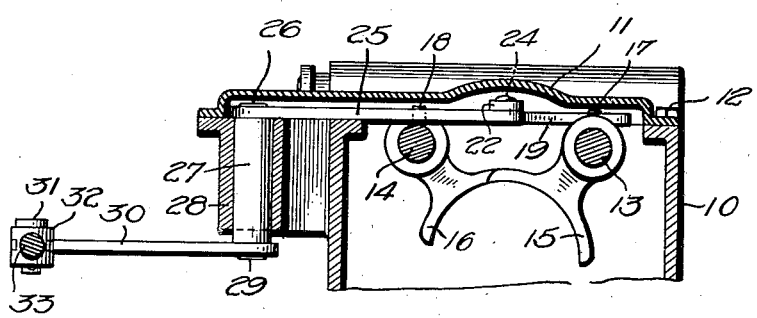
Figure 3:
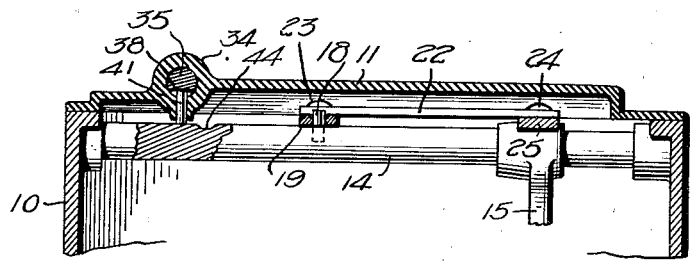
Figure 4:
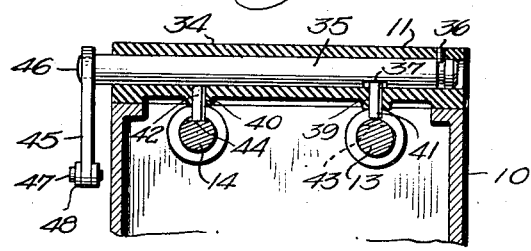
Figure 5:
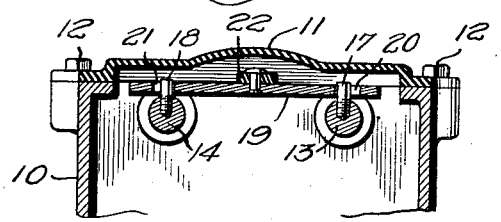
Figures 6, 7:
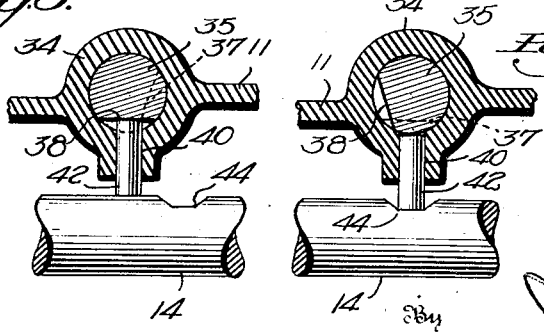

Figure 1 is a perspective view of the transmission showing the cover plate removed and with the selecting shaft in its normal position, Figure 2 is a fragmentary sectional view on line 2—2 of Figure 1, Figure 3 is a similar view on line 3—3 of Figure 1, taken longitudinally of the transmission, Figure 4 is a similar view on line 4—4 of Figure 1, taken transversely of the transmission, Figure 5 is a similar view on line 5—5 of Figure 1, Figure 6 is an enlarged fragmentary sectional view taken substantially on the vertical plane indicated by the line 6—6 in Figure 1, showing the parts in unlocked position, and, Figure 7 is a similar view showing the parts in locked position.

Referring to the drawings, the numeral 10 designates the transmission housing as a whole which is normally closed by a cover plate 11 bolted in position as at 12. The transmission includes the usual low and reverse gear shift rail 13 and second and high gear shift rail 14, these rails being provided with the usual shift forks 15 and 16 respectively.

In the embodiment of the invention illustrated, the shift rails are respectively provided with upstanding pins 17 and 18, as shown in Figures 1 and 5. An operating lever 19, which may be termed a "whiffle-tree" extends transversely across the shift rails as shown in Figure 1 and is provided in its ends with slots 20 and 21 through which the respective pins 17 and 18 extend. A link 22 extends longitudinally of the transmission between the shift rails 13 and 14 and has one end pivotally connected as at 23 to the lever or whiffle-tree 19. The pivot 23 may be located midway between the shift rails or may be located slightly to one side of such position for the purpose of compensating for the differences of travel of the shift rails, as will become apparent.

The other end of the link 22 is pivotally connected as at 24 to a crank arm 25 extending laterally of the transmission when the shift rails are in neutral position, as shown in Figure 1. The crank arm 25 extends beyond the adjacent wall of the transmission 10 and is fixed at its upper end as at 26 to a vertical shaft 27. This shaft is adapted to be rocked by means to be described and is supported for such rocking movement by a bearing 28. This bearing may be formed integral with or carried by either the transmission casing or cover plate and is shown in the present embodiment as being formed integral with the transmission casing.

The lower end of the shaft 27 is fixed as at 29 to an operating arm 30, as shown in Figures 1 and 2. The outer end of the arm 30 is pivotally connected as at 31 to a fork 32 carried by one end of an operating member 33. The present apparatus is particularly intended for use with power operated mechanisms for actuating the shift rails, and accordingly the member 33 may be the piston rod of a fluid pressure shifting motor, or may be connected in any manner to be power operated to rock the arm 30. It will be apparent that when the arm 30 is rocked, motion will be transmitted to the whiffle-tree 19 to tend to move both of the shift rails 13 and 14, and means to be described are operative for releasing one shift rail at a time for actuation by the whiffle-tree.

As shown in Figures 3, 4, 6 and 7, the cover plate 11 is provided with a bearing 34 extending transversely with respect to the transmission and supporting a shaft 35 for rocking movement. As clearly shown in Figures 1 and 4, the shaft 35 extends over both of the shift rails, and any means, such as a screw 36 (Figure 4), may be employed for fixing the shaft 35 against axial movement.

In the vertical planes of the respective shift rails 13 and 14, the shaft 35 is provided with notches 37 and 38, and these notches are circumferentially offset with respect to the shaft 35 as indicated in Figures 6 and 7. The bottom of the bearing 34 is provided with vertical openings 39 and 40 to receive locking means 41 and 42 respectively, shown in the present instance as being vertically slidable pins. It will become apparent that the locking members need not be in the form of the pins illustrated in the drawings, but regardless of their form, these locking members are movable downwardly by gravity. The shift rails 13 and 14 are provided respectively with notches 43 and 44 to receive the lower ends of the respective pins 41 and 42. However, the notches of the respective shift rails are adapted to receive the lower ends of the locking pins only when the rails are in neutral position, as will be described.

As shown in Figures 1 and 4, one end of the shaft 35 is provided with an operating crank 45 fixed thereto as at 46. The lower end of the crank 45 is pivotally connected as at 47 to a yoke 48 carried by an operating rod 49. This rod may be actuated in any suitable manner, but as will become apparent, it is not necessary to provide any power means for operating the rod 49 in view of the very slight resistance offered to rocking movement of the shaft 35.

The operation of the apparatus is as follows:

As is well known, the first step in shifting gears in an automobile transmission consists in selecting one of the shift rails for operation, followed by the movement of the selected shift rail in the desired direction into one of the gear positions. These operations ordinarily are accomplished in a manually controlled transmission by moving the gear shift lever to select the desired shift rail and then longitudinally moving the selected shift rail into a gear position. In the present construction, selection of one of the rails is effected, when both rails are in neutral position, by rocking the crank arm 45. Movement of the selected shift rail into the desired gear position is effected by rocking the crank arm 30. Assuming that both of the shift rails are in neutral position, the shift rail notches 43 and 44 will be in transverse alignment, as shown in Figure 1. If the operator then desires to shift into low gear, it is necessary to select the shift rail 13 for actuation and to move such rail forwardly, that is, away from the operator as viewed in Figure 1. Accordingly the means connected to the rod 49 is operated to rock the crank arm 45 in a clockwise direction, as viewed in Figure 1. Assuming that the shaft 35 has been previously in the position shown in Figure 6, the rocking of the crank arm 45 in the manner described turns the shaft 35 to the position shown in Figure 7. Under such conditions, the notch 37 will face downwardly, while the notch 38 will be turned out of alignment with the associated locking pin 42. Accordingly a circular portion of the shaft 35 will be presented to the upper end of the locking pin 42 and the latter, which will be arranged in the associated notch 44 when the shift rail 14 is in neutral position, will be prevented from moving upwardly. Accordingly it will be impossible for the rail 14 to be shifted longitudinally.

On the other hand, while the pin 41 will have its lower end arranged in its corresponding notch 43 in the shift rail 13, the pin 41 is free to move upwardly due to its registration with the notch 37 in the shaft 35. As will become apparent, therefore, the shift rail 13 will be selected for actuation.

Selection of the shift rail 13 having been made, the operator may now perform the necessary function to effect movement of the crank arm 30. This movement is preferably performed by a suitable motor, and under the conditions being considered, the crank arm 30 will swing toward the operator as viewed in Figure 1. Movement is transmitted from the arm 30 through shaft 27 to the arm 25, and from this arm the motion will be transmitted to the link 22 to move this link longitudinally forwardly with respect to the transmission.

The forward end of the link 22 is connected to the whiffle-tree 19 at a point between the pins 17 and 18, and accordingly movement of the link 22 tends to move both of the shift rails 13 and 14 forwardly. However, the previously described selecting operation having been performed, the shaft 35 prevents upward movement of the pin 42 out of the shift rail notch 44, and accordingly the shift rail 14 is prevented from moving. The transmission of force to the whiffle-tree 19 therefore, causes this element to fulcrum about the pin 18, whereupon force will be transmitted to the pin 17 to shift the rail 13 forwardly. While the pin 41 will have been arranged in the notch 43 when the shift rail 13 was in neutral position, this pin is freely movable upwardly upon the transmission of force to the shift rail 13, the sloping end of the notch 43 effecting a cam action to move the pin 41 vertically whereby the upper end of the pin 41 is received in the notch 37. Accordingly, the shift rail 13 will be moved forwardly into the low gear position.

When it is desired to shift into second gear, movement is transmitted to the crank arm 30 to swing this arm away from the operator as viewed in Figure 1. The shift rail 14 being locked against movement in the manner described, the whiffle-tree 19 will transmit movement to the shift rail 13, this rail being moved rearwardly until the notch 43 is again brought into vertical alignment with the pin 41. Movement of the arm 30 is then momentarily arrested pending selection of the shift rail 14 for operation. This action is accomplished by moving the crank arm 45 in a counter-clockwise direction from the position previously described. Under such conditions, the shaft 35 will assume the position shown in Figure 6 with the notch 38 arranged above the pin 42. It will be apparent that the pin 41 will be supported on the circular portion of the shift rail 13 until the latter is returned to neutral position, at which point the pin 41 will have dropped into the notch 43. The movement of the shaft 35 in the manner described will then turn a circular portion of this shaft into position above the pin 41, whereupon upward movement of the pin will be prevented. Under such conditions, therefore, the pin 41 will lock the shift rail 13 against movement, but the pin 42 will be free to move upwardly into the notch 38.

The shift rail 14 will now be selected for operation, and the crank arm 30 again may be moved forwardly, or away from the operator, as viewed in Figure 1, whereupon the link 22 will exert a pull upon the whiffle-tree 19. The shift rail 14 having been selected for operation, the whiffle-tree will fulcrum about the pin 17 and movement will be transmitted to the pin 18 to move the shift rail 14 rearwardly or toward the operator as viewed in Figure 1. Upon movement of the shift rail 14 out of neutral position, the tapered ends of the notch 44 will provide a cam action to move the pin 42 upwardly to arrange the upper end of the pin in the notch 38 of the shaft 35. This freedom of movement of the pin 42 obviously frees the shift rail 14 for movement into the second gear position referred to.

Since the rail 14 is both the second and high gear shift rail, the shift may be made into high gear from second gear without operating the arm 45. It merely is necessary to swing the arm 30 toward the operator through its limit of movement whereupon the shift rail 14 will move through neutral position and forwardly into high gear position. As the shift rail 14 passes neutral position, the pin 42, of course, will drop by gravity into the notch 44, but upon continued movement of the shift rail 14, the pin 42 will be moved upwardly to the position shown in Figure 6, and accordingly it will be apparent that the shift rail 14 is free to move continuously from the second to the high gear position.

The shift into reverse gear is made by moving the shift rail 13 rearwardly, or toward the operator, as viewed in Figure 1. Selection of the shift rail 13 in operation is effected in the same manner as for low gear, the arm 45 being moved away from the operator as viewed in Figure 1 when both shift rails are in neutral position, in which case the shift rail 14 will be locked against movement. The arm 30 then may be moved away from the operator as viewed in Figure 1, and the whiffle-tree 19 will fulcrum about the pin 18 and movement will be transmitted to the shift rail 13 to move it rearwardly into reverse gear position.

From the foregoing it will be apparent that selection of the shift rails for operation may be made when both shift rails are in neutral position merely by slightly rotating the shaft 35. This movement is accomplished without the frictional resistance encountered in most transmission shifting mechanisms where it is necessary to slide or otherwise move a selecting element. Attention is invited to the fact that the pins 42 are freely vertically movable and drop by gravity into the notches 43 and 44 when these notches are arranged beneath the locking pins. Accordingly the shaft 35 is free to turn without encountering any resistance from the pins 41 and 42, there being no springs or any other means for offering resistance to the turning movement of the shaft 35.

It also will be apparent that the shaft 35 can never be turned except when both shift rails are in neutral position. For example, assuming that the parts are in the position shown in Figure 6 with the shift rail 14 in second gear position, it will be apparent that the shaft 35 cannot be turned since the notch 38 will engage the upper end of the pin 42. This pin being fixed against downward movement by being supported by the rail 14, the upper end of the pin engages the notch 38 to prevent turning movement of the shaft 35. Similarly, when the shift rail 13 is in a gear position, it supports its pin 41 with its upper end in the notch 37, thus likewise preventing turning movement of the shaft 35. When both shift rails are in neutral position, the pins 41 and 42 drop into their associated notches 43 and 44 under which conditions the shaft 35 is free to turn to select either shift rail for operation. Any suitable means may be employed for limiting the turning movement of the arm 45 or shaft 35 beyond the two operative positions of the shaft 35.

In view of the substantial elimination of friction or any other resistance to the action of selecting the shift rails for operation, it will be apparent that the present apparatus is particularly suitable for use in power shifting mechanisms, without the use of a crossover motor and control mechanism therefor through which the shift may be transferred from one rail to the other. In the present construction, longitudinal shifting force is transmitted to the whiffle-tree 19 to tend to move both shift rails but only one of these rails at a time is released for movement. The other shift rail will be positively locked against movement by the simple and highly efficient means described, the locking of one shift rail determining which of the pins 17 or 18 shall act as the fulcrum for the whiffle-tree 19.

Where both shift rails move the same distances into their gear positions, the pivot 23 may be arranged midway between the pins 17 and 18. In synchronizing transmissions, the low and reverse gear shift rail ordinarily moves a greater distance on each side of neutral position than the second and high gear shift rail 14. If desired, this difference in the distance of movement of the shift rails may be compensated for by arranging the pivot 23 slightly closer to the pin 18.

When either shift rail is moved from one of its gear positions to the other, the associated locking pin will drop by gravity into the corresponding shift rail notch when the shift rail moves through neutral position. As previously stated, the sloping ends of the notches 43 and 44 permit the locking pin, under such conditions, to be easily moved upwardly upon continued movement of the shift rail past neutral position. The lifting of the pin as neutral position is passed, offers very slight resistance to movement of the shift rail, but this resistance is sufficient to advise the operator when neutral position is reached, if the longitudinal shift is made manually or through some mechanism by which the operator feels resistance to the shifting movement. If desired, a conventional spring detent may be employed for assisting the operator in locating neutral position, and for holding either shift rail in either of its gear positions when moved to such position. Such a spring detent being conventional, it has not been illustrated in the drawings.

While the present construction is intended for use with a transmission arranged in accordance with conventional practice with the shift rails lying in a horizontal plane, the invention is also applicable to a so-called "rolled over" transmission wherein the shift rails are arranged in a vertical plane. In other words, some transmissions are now turned 90° from the position shown in Figure 1, in which case the shift rails are arranged one above the other, and the selecting shaft 35, in such case would occupy a vertical position.

With a transmission of the character referred to the pins 41 and 42 obviously would not drop by gravity into the shift rail notches. However, these elements are so freely movable that the operation is fully as practicable for use with a rolled over transmission as with a conventional transmission. It will be apparent that the inner surfaces of the notches 37 and 38, upon rocking movement of the shaft 35 with the shift rails in neutral position, provide a cam action for moving the selected locking element in its locking position. This operation takes place with so little resistance that the manual selection of the shift rails can be accomplished without substantially increased resistance against turning movement of the shaft 35 when the apparatus is employed with a rolled over transmission.

While the pins 41 and 42 are intended to drop into locking position by gravity when the apparatus is employed with a conventional transmission, it is probable that these elements at times, due to the viscosity of the transmission lubricant, may be prevented from moving by gravity. Under such conditions, it will be apparent that the cam action provided by the notches 37 and 38 will positively effect movement of the selected locking pin to locking position. Similarly, with either type of transmission, the sloping ends of the notches 43 and 44 will operate to effect positive movement of either locking pin to its unlocked position when it is released for such movement and force is transmitted to move one of the shift rails longitudinally.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a transmission comrising a casing including a cover plate as a part thereof and having a plurality of members shiftable for providing different gear ratios, of a pair of rock shafts projecting from said casing and each provided with an operating crank externally of said casing, a floating lever within said casing connected at its ends to said shiftable members, means operated by one of said shafts for transmitting a force to said lever intermediate its ends to tend to move both shiftable members, and means operable by the other shaft for rendering one end of said lever ineffective for moving its associated shiftable member whereby the other end of said lever will effect movement of its associated shiftable member, said other shaft being journaled in said cover plate and removable therewith from the body of said casing.

2. The combination with a transmission comprising a casing including a cover plate as a part thereof and having a plurality of members shiftable for providing different gear ratios, of a pair of rock shafts projecting from said casing and each provided with an operating crank externally of said casing, a floating lever within said casing connected at its ends to said shiftable members, means operated by one of said shafts for transmitting a force to said lever intermediate its ends to tend to move both shiftable members, and means operable by the other shaft for rendering one end of said lever ineffective for moving its associated shiftable member whereby the other end of said lever will effect movement of its associated shiftable member, said other shaft being journaled in said cover plate and removable therewith from the body of said casing, said first named shaft being supported by said casing for rocking movement on a vertical axis.

3. The combination with a transmission comprising a casing including a cover plate as a part thereof and having a plurality of members shiftable for providing different gear ratios, of a pair of rock shafts projecting from said casing and each provided with an operating crank externally of said casing, a floating lever within said casing connected at its ends to said shiftable members, means operated by one of said shafts for transmitting a force to said lever intermediate its ends to tend to move both shiftable members, and means operable by the other shaft for selectively engaging said shiftable members for rendering either member immovable whereby the other end of said lever will move its associated shiftable member, said other shaft being journaled in said cover plate and removable therewith from the body of said casing.

4. The combination with a transmission comprising a casing including a cover plate as a part thereof and having a plurality of members shiftable for providing different gear ratios, of a pair of rock shafts projecting from said casing and each provided with an operating crank externally of said casing, a floating lever within said casing connected at its ends to said shiftable members, means operated by one of said shafts for transmitting a force to said lever intermediate its ends to tend to move both shiftable members, and means operable by the other shaft for selectively engaging said shiftable members for rendering either member immovable whereby the other end of said lever will move its associated shiftable member, said other shaft being journaled in said cover plate and removable therewith from the body of said casing, said first named shaft being supported by said casing for rocking movement on a vertical axis.

5. The combination with a transmission having a plurality of members shiftable for providing different gear ratios, of means arranged above said shiftable members and provided with a guide opening arranged above each shiftable member, a locking element mounted in each opening and movable to a locking position in engagement with the corresponding shiftable member, a rock shaft supported by said first named means, said rock shaft being constructed and arranged to selectively hold all of said locking elements except one in locking position, and means for transmitting a force tending to simultaneously move said shiftable members.

6. The combination with a transmission having a plurality of members shiftable for providing different gear ratios, of a bearing extending transversely of said shiftable members and arranged thereabove, said bearing being provided in the bottom thereof with a guide opening arranged above each shiftable member, a locking element arranged in each opening and movable to a locking position in engagement with the associated shiftable member, a shaft mounted in said bearing, said shaft having portions constructed and arranged to selectively hold all of said locking elements except one in locking position, and means for transmitting a force tending to simultaneously move said shiftable members.

7. The combination with a motor vehicle transmission having a plurality of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and movable to a locking position in engagement with one of said notches when the corresponding shiftable member is in neutral position, a shaft mounted in said bearing and constructed and arranged for selectively holding all of said locking elements except one in locking position, and means for transmitting a force tending to simultaneously move said shiftable members.

8. The combination with a motor vehicle transmission having a plurality of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and movable to a locking position in engagement with one of said notches when the corresponding shiftable member is in neutral position, a rock shaft mounted in said bearing, said shaft being provided with circumferentially spaced notches selectively movable to positions in alignment with the respective locking elements whereby one locking element is selectively released for movement from its locking position while the remaining locking elements are held in locking position, and means for transmitting a force tending to simultaneously move said shiftable members.

9. The combination with a motor vehicle transmission having a plurality of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members being provided with upwardly facing notches arranged in a common plane transverse to said shiftable members when the latter are in neutral position, a locking element mounted in each of said openings and movable by gravity to a locking position in engagement with the notch of the associated shiftable member when the latter is in neutral position, a shaft mounted in said bearing and constructed and arranged for selectively holding all of said locking elements except one in locking position, and means for transmitting a force tending to simultaneously move said shiftable members.

10. The combination with a motor vehicle transmission having a plurality of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members being provided with upwardly facing notches arranged in a common plane transverse to said shiftable members when the latter are in neutral position, a locking element mounted in each of said openings and movable by gravity to a locking position in engagement with the notch of the associated shiftable member when the latter is in neutral position, a rock shaft mounted in said bearing, said shaft being provided with circumferentially spaced notches selectively movable to positions above the respective locking elements whereby each locking element is selectively released for movement from its locking position while the remaining elements are held in locking position, and means for transmitting a force tending to simultaneously move said shiftable members.

11. The combination with a motor vehicle transmission having a pair of members shiftable for providing different gear ratios, of means arranged above said shiftable members and provided with a guide opening arranged above each shiftable member, a locking element mounted in each opening for downward movement to a locking position in engagement with the corresponding shiftable member, a rock shaft supported above said first named means, said rock shaft being constructed and arranged for selectively holding one of said locking elements in locking position to lock the corresponding shiftable member, a whiffle-tree lever having connection at its ends with said shiftable members, and means connected for transmitting a force to said lever intermediate its ends for moving the other of said shiftable members.

12. The combination with a motor vehicle transmission having a pair of members shiftable for providing different gear ratios, of a bearing extending transversely of said shiftable members and arranged thereabove, said bearing being provided in the bottom thereof with a vertical guide opening arranged above each shiftable member, a locking element arranged in each opening and movable to a locking position in engagement with the associated shiftable member, a shaft mounted in said bearing, said shaft having portions constructed and arranged to selectively hold one of said locking elements in locking position to lock the corresponding shiftable member, a whiffle-tree lever having connection at its ends with said shiftable members, and means for transmitting a force to said lever intermediate the ends thereof to move the other of said shiftable members.

13. The combination with a motor vehicle transmission having a pair of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and freely movable to a locking position in engagement with one of said notches when the corresponding shift member is in neutral position, a shaft mounted in said bearing and constructed and arranged for selectively holding one of said locking elements in locking position to lock the corresponding shiftable member, a whiffle-tree lever having connection at its ends with said shiftable members, and means for transmitting a force to said lever intermediate its ends to move the other of said shiftable members.

14. The combination with a motor vehicle transmission having a pair of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and freely movable to a locking position in engagement with one of said notches when the corresponding shift member is in neutral position, a rock shaft mounted in said bearing, said shaft being provided with circumferentially spaced notches selectively movable to positions in alignment with the respective locking elements whereby one of said elements is selectively held in locking position to lock the corresponding shiftable member, a whiffle-tree lever having connection at its ends with said shiftable members, and means for transmitting a force to said lever intermediate its ends to move the other of said shiftable members.

15. The combination with a motor vehicle transmission having a pair of members arranged substantially parallel to each other and each shiftable in opposite directions from neutral position for providing different gear ratios, of a bearing extending transversely of said shiftable members and arranged thereabove, said bearing having vertical guide openings in the bottom thereof each arranged above one of said shiftable members, said shiftable members being provided with upwardly facing notches arranged in a common plane transverse to said shiftable members when the latter are in neutral position, a locking element mounted in each of said openings and movable by gravity to a locking position in engagement with the notch of the associated shiftable member when the latter is in neutral position, a shaft mounted in said bearing and constructed and arranged to selectively hold one of said locking elements in locking position to lock the corresponding shiftable member, a whiffle-tree lever having connection at its ends with said shiftable members, and means for transmitting a force to said lever intermediate its ends to move the other of said shiftable members.

16. The combination with a motor vehicle transmission having a pair of members arranged substantially parallel to each other and each shiftable in opposite directions from neutral position for providing different gear ratios, of a bearing extending transversely of said shiftable members and arranged thereabove, said bearing having vertical guide openings in the bottom thereof each arranged above one of said shiftable members, said shiftable members being provided with upwardly facing notches arranged in a common plane transverse to said shiftable members when the latter are in neutral position, a locking element mounted in each of said openings and movable by gravity to a locking position in engagement with the notch of the associated shiftable member when the latter is in neutral position, a rock shaft mounted in said bearing and provided with circumferentially spaced notches separately movable to positions above the respective locking elements whereby each locking element is released for movement from its locking position while the other locking element is held in locking position, a whiffle-tree lever having connection at its ends with said shiftable members, and means for transmitting a force to said lever intermediate its ends to move the shiftable member whose corresponding locking element is released.

17. The combination with a motor vehicle transmission having a pair of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members having upwardly facing notches arranged in a common plane transverse to said shiftable members when the latter are in neutral position, a locking pin corresponding in cross-sectional shape to and mounted for vertical movement in each of said openings, each locking pin being movable by gravity to a locking position in engagement with the notch of the associated shiftable member when the latter is in neutral position, each notch and its associated pin being constructed and arranged whereby the pin is moved upwardly out of engagement with the notch upon longitudinal movement of the associated shiftable member, a shaft mounted in said bearing and constructed for selectively holding one of said pins in its locking position, and means constructed and arranged to tend to simultaneously move said shiftable members.

18. The combination with a motor vehicle transmission having a pair of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members having upwardly facing notches arranged in a common plane transverse to said shiftable members when the latter are in neutral position, a locking pin corresponding in cross-sectional shape to and mounted for vertical movement in each of said openings, each locking pin being movable by gravity to a locking position in engagement with the notch of the associated shiftable member when the latter is in neutral position, each notch and its associated pin being constructed and arranged whereby the pin is moved upwardly out of engagement with the notch upon longitudinal movement of the associated shiftable member, a shaft mounted in said bearing and constructed for selectively holding one of said pins in its locking position to lock the corresponding shiftable member, a whiffle-tree lever having connection at its ends with said shiftable members, and means for transmitting a force to said lever intermediate its ends to move the other of said shiftable members.

19. The combination with a motor vehicle transmission having a pair of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members having upwardly facing notches arranged in a common plane transverse to said shiftable members when the latter are in neutral position, a locking pin corresponding in cross-sectional shape to and mounted for vertical movement in each of said openings, each locking pin being movable by gravity to a locking position in engagement with the notch of the associated shiftable member when the latter is in neutral position, each notch and its associated pin being constructed and arranged whereby the pin is moved upwardly out of engagement with the notch upon longitudinal movement of the associated shiftable member, a shaft mounted to rock in said bearing and provided with circumferentially spaced notches separately movable to positions above the respective locking pins whereby either locking pin is released for movement from its locking position while the other pin is held in locking position, and means connected and arranged for transmitting a force tending to simultaneously move both shiftable members.

20. The combination with a motor vehicle transmission having a pair of members arranged substantially parallel to each other and each shiftable in opposite directions from a neutral position for providing different gear ratios, of a bearing extending transversely of said shiftable members and arranged thereabove, said bearing having vertical guide openings in the bottom thereof each arranged above one of said shiftable members, said shiftable members having upwardly facing notches arranged in a common plane transverse to said shiftable members when the latter are in neutral position, a locking pin corresponding in cross-sectional shape to and mounted for vertical movement in each of said openings, each locking pin being movable by gravity to a locking position in engagement with the notch of the associated shiftable member when the latter is in neutral position, each notch and its associated pin being constructed and arranged whereby the pin is moved upwardly out of engagement with the notch upon longitudinal movement of the associated shiftable member, a shaft mounted to rock in said bearing and provided with circumferentially spaced notches separately movable to positions above the respective locking pins whereby either locking pin is released for movement from its locking position while the other pin is held in locking position, a whiffle-tree lever having connection at its ends with said shiftable members, and means for transmitting a force to said lever intermediate its ends to move the shiftable member whose corresponding locking pin is released.

21. The combination with a motor vehicle transmission having a plurality of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and freely movable to a locking position in engagement with one of said notches when the corresponding shiftable member is in neutral position, a rock shaft mounted in said bearing, said shaft being provided with circumferentially spaced notches selectively movable to positions in alignment with the respective locking elements whereby one locking element is selectively released for movement from its locking position while the remaining locking elements are held in locking position, the notches in said rock shaft being constructed and arranged to provide a cam action for moving the respective locking members into locking position upon turning movement of said shaft, and means connected for moving the shiftable member which has its corresponding locking element released.

22. The combination with a motor vehicle transmission having a pair of members arranged substantially parallel to each other and each shiftable in opposite directions from a neutral position for providing different gear ratios, of a bearing extending transversely with respect to said shiftable members, said bearing having guide openings each arranged perpendicular to one of said shiftable members, said shiftable members being provided with notches respectively in alignment with said openings when said shiftable members are in neutral position, a locking element mounted in each opening and freely movable to a locking position in engagement with one of said notches when the corresponding shift member is in neutral position, a rock shaft mounted in said bearing, said shaft being provided with circumferentially spaced notches selectively movable to positions in alignment with the respective locking elements whereby one of said elements is selectively held in locking position to lock the corresponding suitable member, each notch in said shaft being constructed to provide a cam action for moving the corresponding locking element into locking position upon turning movement of said shaft, a whiffle-tree lever having connection at its ends with said shiftable members, and means for transmitting a force to said lever intermediate its ends to move the other of said shiftable members.

JOHN A. LAWLER.